(12) United States Patent
Skvorecz

(10) Patent No.: US 7,954,772 B2
(45) Date of Patent: Jun. 7, 2011

(54) WIRE CHAFING STAND AND METHOD

(76) Inventor: Robert Skvorecz, Patterson, NJ (US)

( * ) Notice: Subject to any disclaimer, the term of this patent is extended or adjusted under 35 U.S.C. 154(b) by 0 days.

(21) Appl. No.: 11/786,224

(22) Filed: Apr. 11, 2007

(65) Prior Publication Data

US 2008/0251657 A1    Oct. 16, 2008

(51) Int. Cl.
*A47G 23/02* (2006.01)

(52) U.S. Cl. ............... 248/153; 248/175; 211/181.1; 126/40; 99/449; D7/393

(58) Field of Classification Search .......... 248/153, 248/175; 211/181.1; D6/458; 126/40; 99/449; D7/366, 355, 393, 396.1; D11/155
See application file for complete search history.

(56) References Cited

U.S. PATENT DOCUMENTS

| | | | | | |
|---|---|---|---|---|---|
| 2,007,997 A | * | 7/1935 | Beulke et al. | ............ | 220/9.4 |
| 2,110,726 A | * | 3/1938 | Harvey | ............ | 211/153 |
| 2,269,425 A | * | 1/1942 | Bitney | ............ | 211/198 |
| 2,838,198 A | * | 6/1958 | Vidal | ............ | 206/509 |
| D189,469 S | * | 12/1960 | Fischer | ............ | D7/366 |
| 2,979,242 A | * | 4/1961 | Van Huis et al. | ............ | 294/169 |
| D213,899 S | * | 4/1969 | Rickmeier | ............ | D7/355 |
| 5,287,800 A | * | 2/1994 | Orednick | ............ | 99/449 |
| 5,819,640 A | * | 10/1998 | Cuomo et al. | ............ | 99/483 |
| D406,984 S | * | 3/1999 | Skvorecz | ............ | D7/393 |
| 5,921,513 A | * | 7/1999 | Skvorecz | ............ | 248/153 |
| 5,996,948 A | * | 12/1999 | Skvorecz | ............ | 248/153 |
| 6,047,932 A | * | 4/2000 | Skvorecz | ............ | 248/153 |
| 6,520,354 B1 | * | 2/2003 | Skvorecz | ............ | 211/181.1 |
| D485,706 S | * | 1/2004 | O'Connell Cooper et al. | ............ | D6/462 |

* cited by examiner

*Primary Examiner* — Anita M King
(74) *Attorney, Agent, or Firm* — Baker Hostetler LLC

(57) ABSTRACT

The wire chafing stand of the present invention comprises a rim configured in any desired geometry having longitudinal and lateral sides and a plurality of wire legs extending from the rim with at least one end of each wire leg or both being welded to the rim such that a T-welded intersection is substantially formed between the wire legs and at least the longitudinal sides of the rim in which the longitudinal axis of each such wire leg intersects the longitudinal axis of the rim to form an included angle of substantially 90°.

2 Claims, 5 Drawing Sheets

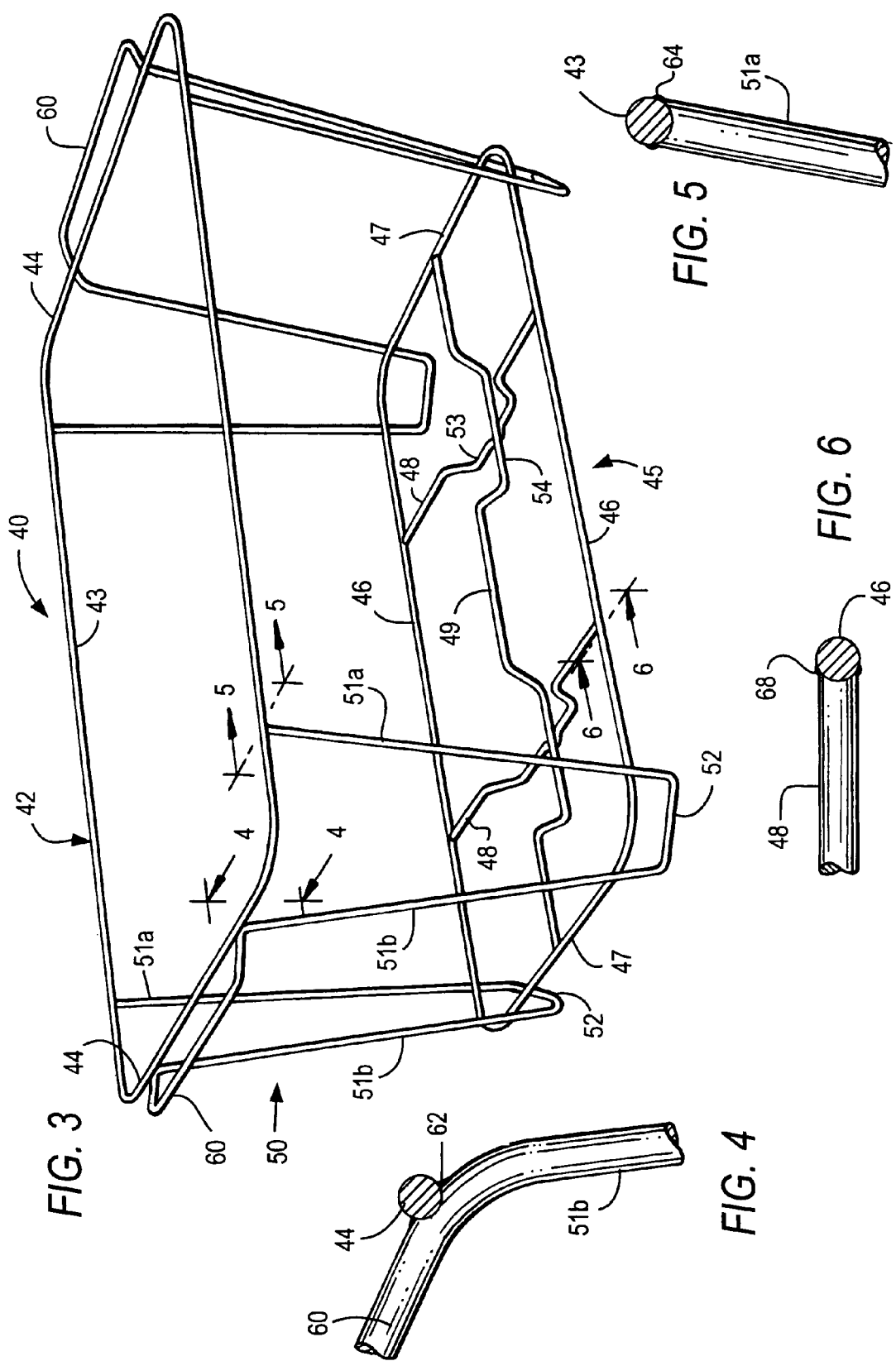

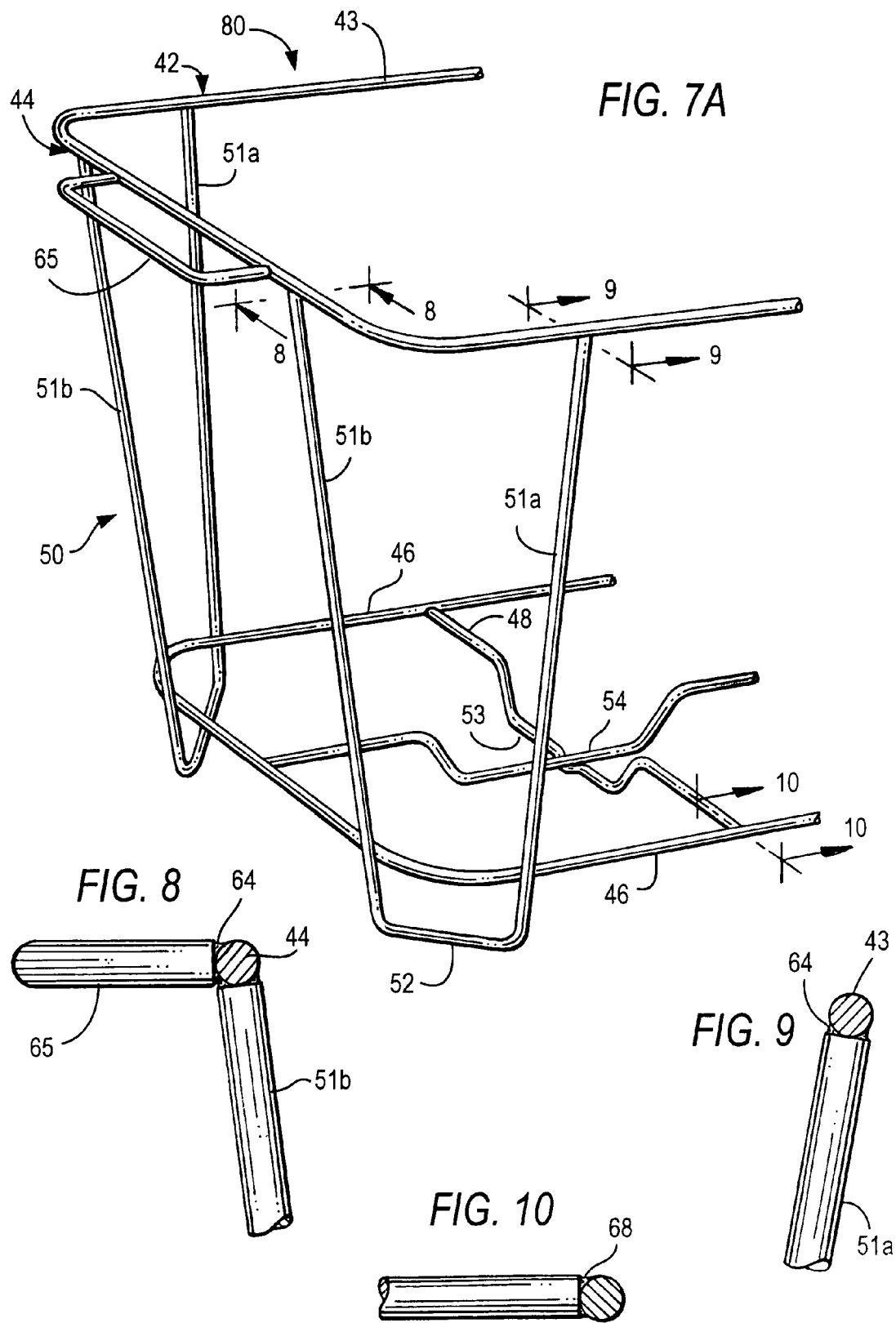

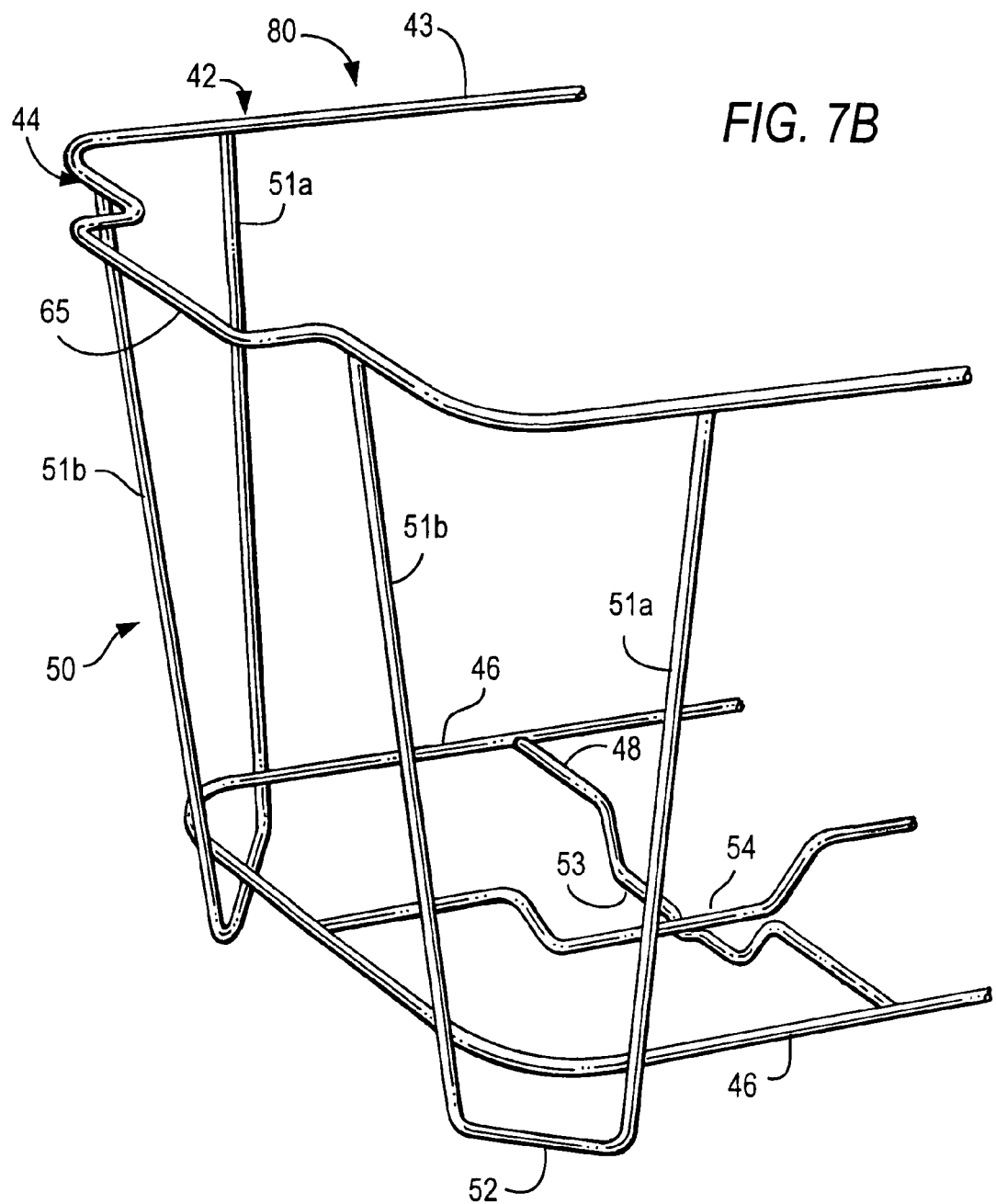

WIRE CHAFING STAND AND METHOD

FIELD OF INVENTION

This invention relates to an improved wire chafing stand and method which permits a multiplicity of wire chafing stands to be readily stacked in a nested relationship with other wire chafing stands of the same design for compact storage and efficient transportation.

BACKGROUND OF THE INVENTION

A chafing stand is a device used to support aluminum or stainless steel pans and auxiliary fuel heaters for the purpose of maintaining and heating pre-cooked food at a location remote from the kitchen where the food was originally prepared and cooked. The cost of transportation from the point of manufacture to the distributor and/or to the retailer is a critical economic factor in the pricing of the chafing stand.

The chafing stand is designed as an open structure having a wire frame of steel which includes a rim of preferably rectangular geometry and a plurality of wire legs extending from the rim to maintain the chafing stand in an upright position so that the pan containing heated food can be supported above ground by the chafing stand at a height essentially level with the ground.

In an alternative embodiment the wire frame of the chafing stand may include an upper rim, a lower rim and a plurality of wire legs extending from the lower rim to the ground with the upper rim adapted to support the aluminum pan at a level height above ground and the lower rim adapted to support a plurality of auxiliary fuel heaters below the aluminum pan. The chafing stand in each embodiment has very little weight but its physical dimensions occupy substantial volume. Accordingly, the cost of shipping and transportation is controlled by the volume of the chafing stand and not its weight. To minimize the cost of transportation it is desirable to transport a multiple number of stands nested together in a compact arrangement and then to separate the stands at either the retail establishment or the point of local distribution. However, in the past the nested stands would tend to wedge into one another during shipment and were not easily separated.

This problem was overcome in the past by fabricating the chafing stand so as to include "offsets" at locations adjacent to the weld or welded joint formed between the upper rim and the wire legs. The "offsets" cause a lateral displacement between the wire leg and the upper rim at the point of attachment to the upper rim to provide enough additional space to nest multiple stands without causing wedging. This offset principle and various embodiments thereof is taught in U.S. Pat. Nos. 5,996,948, 5,921,513, 6,047,932 and 6,520,354 respectively.

Manufacturing chafing stands with "offsets" adds to the construction cost of the chafing stand since the formation of an offset requires at least one additional bending operation and complicates what is otherwise a relatively simple fabrication into a more complex procedure. In addition, the amount of wire used in forming the wire legs is increased and additional time is added to the manufacturing procedure. Moreover, a conventional "overlap weld" at the contact point of attachment between the rim and the wire leg inevitably results in the wire overhanging the rim i.e., the overlap welding procedure results in forming an overhang of wire inevitably extending beyond the weld. The extension of wire overhanging the weld must be removed or at least filed down to avoid causing an unsafe and possibly dangerous situation which could invite accidental injury.

It has been discovered in accordance with the present invention that a multiple number of chafing stands may be nested together without wedging by welding the rim at least on the longer or longitudinal sides of the rim to one end of each of the wire legs in an arrangement such that the longitudinal axis of the wire legs intersect the longitudinal axis of the rim to form an included angle of substantially 90° and in a configuration substantially in the geometry of a "T" (hereafter "a T welded intersection"). Moreover, it has been discovered that a T welded intersection at least on the longer or longitudinal sides of the rim overcomes the need for "offsets" to prevent wedging and furthermore does not puce any overhang in wire. The method of the present invention is in sharp contrast to the conventional method using an "overlap weld" in the construction of a chafing stand which is believed to be attributable to wedging of multiple chafing stands and is a primary factor causing the wire to overhang at the point of attachment between the rim and the wire leg.

SUMMARY OF THE INVENTION

The chafing stand of the present invention is manufactured as an open structure comprising a wire skeleton or frame of steel including at least one rim in a desired geometrical configuration preferably rectangular having longer sides and shorter sides with the wire frame adapted to support one or more aluminum or stainless steel pans when inserted therein and having a plurality of wire legs extending from the rim to maintain the pan(s) in an upright position above ground. The wire legs are joined to the longer sides of the rim by a welding operation in an arrangement between the wire legs and rim such that the longitudinal axis of each such wire leg intersects the longitudinal axis of the rim to form a weld having a T welded intersection and an included angle of substantially 90 degrees. In the preferred arrangement the longitudinal axis of each wire leg intersects the longitudinal axis of the rim to which it is joined forming an included angle of about 90°.

The chafing stand may also include handles attached at opposite ends of the chafing stand for manually holding the chafing stand. The handles are preferably joined to the smaller sides of the rim. The weld formed at the interconnection between the handle, the wire legs and the rim may be formed in a conventional manner without the necessity of forming a weld having a T welded intersection at the interconnection of the rim, wire legs and handle respectively. In one embodiment of the present invention the handles are formed by interconnecting the wire legs on the shorter lateral sides of the stand and welding the handles directly to the shorter lateral sides of the rim. In a second embodiment the handles are integral with the shorter lateral sides of the rim. In this case the wire legs may also be welded at one end thereof to the rim to form a T welded intersection. In either arrangement the handles may extend from the shorter lateral sides of the rim level with the horizontal or at an inclined angle relative to the horizontal.

In accordance with the method of the present invention a chafing stand is formed having an open wire frame structure of wire steel comprising a rim of substantially rectangular geometry having longer sides and shorter sides with the chafing stand adapted to support one or more pans and having a plurality of wire legs with the plurality of wire legs joined to the rim to maintain the pan in an upright position above ground wherein the wire legs are welded to the longer sides of the rim in an arrangement to form a weld there between such that the longitudinal axis of each wire leg intersects the longitudinal axis of the rim to which it is being welded to form an included angle of substantially 90° and to form a T welded intersection. This method permits multiple chafing stands to be nested without wedging and eliminates any overhang of the wire legs relative to the rim.

The embodiment of wire chafing stand of the present invention which is preferred comprises a rim of generally rectangular configuration having longer sides and shorter sides with the wire frame having a plurality of wire legs for supporting a pan above ground level and with the plurality of wire legs joined to the rim to maintain the pan in an upright position with each of the wire legs having two upstanding sections and a bottom section wherein each upstanding section has one end joined to the longer side of the rim through a weld such that the longitudinal axis of the upstanding section of each such wire leg intersects the longitudinal axis of the rim to which it is joined to form a configuration at each welded joint substantially in the form of a "T".

BRIEF DESCRIPTION OF THE DRAWINGS

Other advantages of the present invention will become apparent from the following detailed description of the invention when read in conjunction with the accompanying drawings of which:

FIG. 3 is an isometric view of a chafing stand of the present invention;

FIG. 4 is a view taken along the lines 4-4 of FIG. 3;

FIG. 5 is a view taken along the lines 5-5 of FIG. 3;

FIG. 6 is a view 4 taken along the lines 6-6 of FIG. 3;

FIG. 7A is a isometric view of a portion of a chafing stand of another embodiment of the present invention similar to FIG. 3 except for the handle configuration;

FIG. 7B is a isometric view identical to FIG. 7A except for the handle configuration;

FIG. 8 is a view taken along the lines 8-8 of FIG. 7A;

FIG. 9 is a view taken along the lines 9-9 of FIG. 9; and

FIG. 10 is a view taken along the lines 10-10 of FIG. 9.

DETAILED DESCRIPTION OF THE INVENTION

Figure 1:
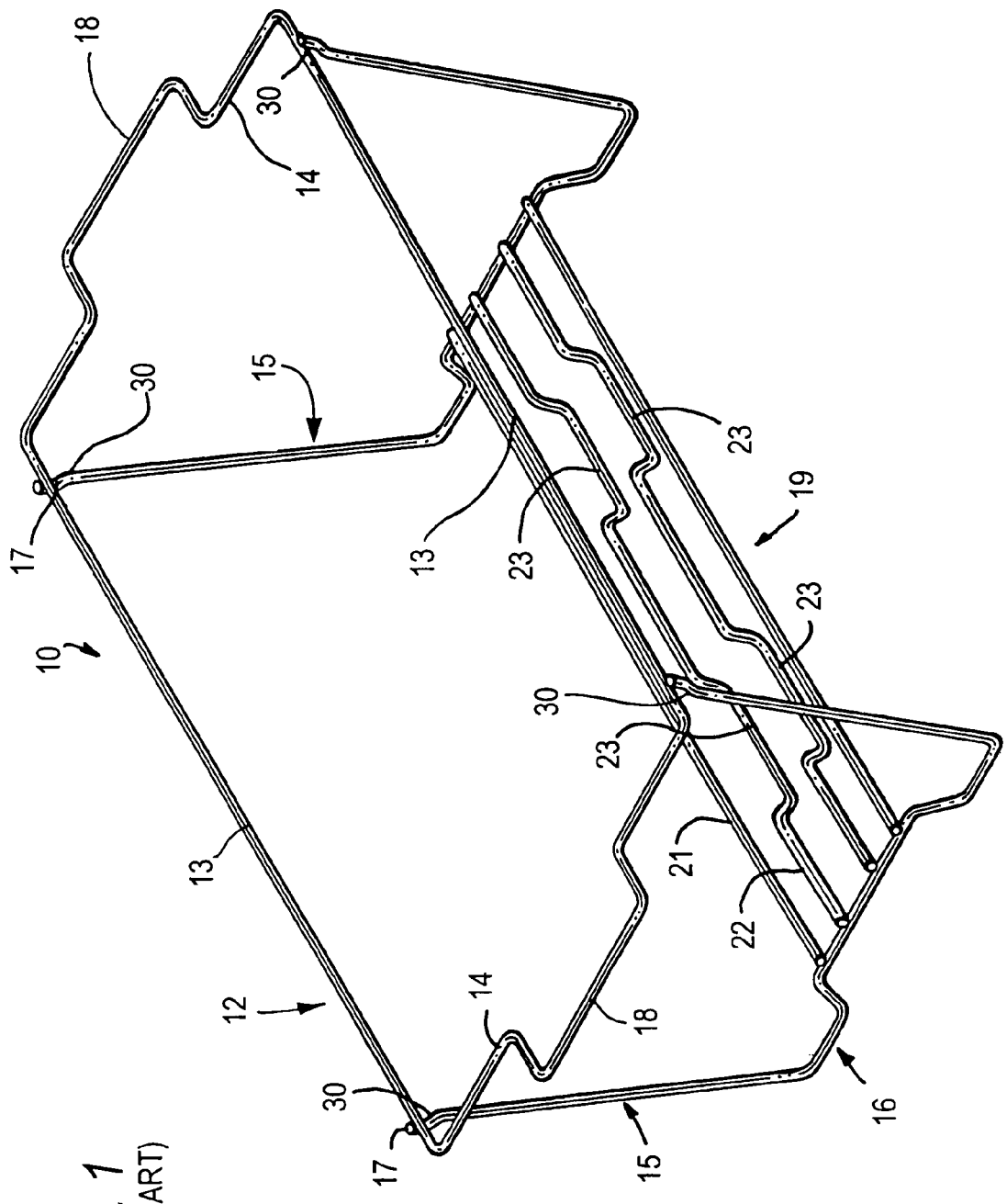
FIG. 1 is an isometric view of a conventional chafing stand having "offsets" in accordance with the prior art to facilitate nesting of one stand into another without wedging.
Figure 2:
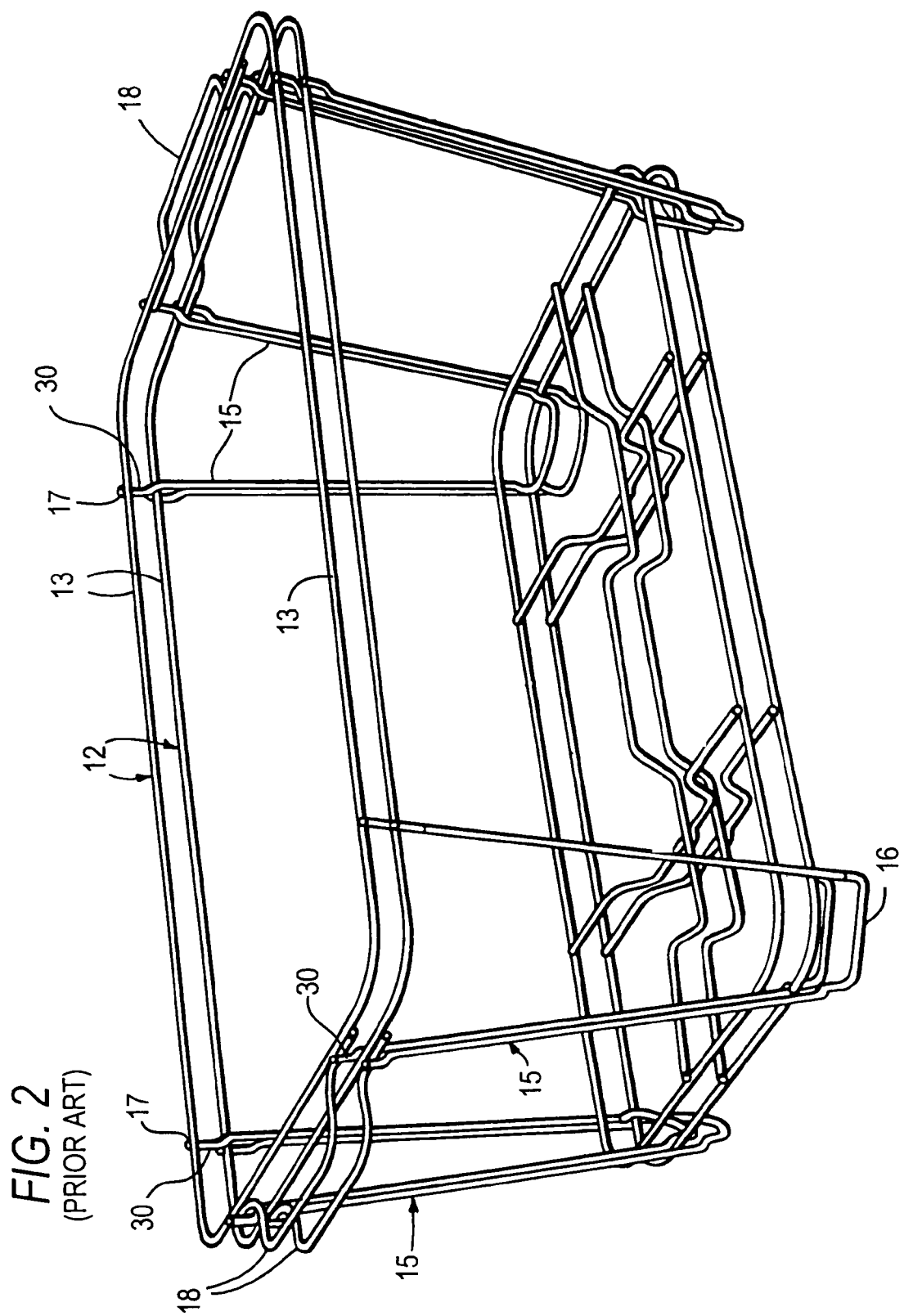
FIG. 2 is an isometric view of another two conventional chafing stands shown nested together with each chafing stand having "offsets" to facilitate nesting without wedging.

FIGS. 1 and 2 illustrate prior art embodiments of a conventional chafing stand. The chafing stand 10 shown in FIG. 1 is a relatively simple structure having a single rim 12 of rectangular geometry with two longer sides 13, two shorter sides 14 and wire legs 15 located at substantially each opposite corner of the stand 10. The wire legs 15 are interconnected by a bottom section 16 intended to be placed on a ground support or on a table so that the wire legs 15 will maintain the chafing stand 10 in an upright position with the rim 12 level with the ground. An aluminum pan (not shown) containing heated food is securely placed into the rim 12 and is supported by the wire legs 15 above ground at a height essentially level with the ground.

The shorter sides 14 of the rim 12 may have handles 18 affixed thereto for manually lifting the chafing stand. The handles 18 may be formed to be an integral part of the lateral sides 14 of the rim as is shown in FIG. 1 or may be separately welded to the lateral sides 14 of the rim as is shown in FIG. 2. A wire holder connector assembly 19 is shown bridging the bottom section 16 of each of the wire legs 15 at the opposite sides of the stand 10 for supporting chafing fuel heaters (not shown). The chafing stand of FIG. 2 is more closely analogous to the configuration shown in U.S. Pat. No. 5,996,948. The wire holder connector assembly 19 includes a plurality of wires 21 and 22 arranged parallel to one another. The wire 22 may have depressions 23 formed therein to support chafing fuel heaters (not shown). A structure having this configuration is shown in U.S. Pat. No. 6,520,354 using reference numbers different from the reference numbers used herein.

The conventional chafing stands 10 of FIGS. 1 and 2 include "offsets" 30 in each of the wire legs 15 formed by a bending operation to facilitate nesting of one stand into another. In the chafing stand 10 of both FIG. 1 and FIG. 2 the offsets 30 are formed in the wire legs 15 at or close to the welded joint 17. As defined in each of the aforementioned patents the description of which is herein incorporated by reference an "offset" is formed by a bending or crimping operation to indent the wire leg thereby causing a lateral displacement of the wire leg and rim nearby each interconnection. The offset was deemed to be essential to the prior art chafing stand to facilitate nesting, i.e., to permit the wire legs in one chafing stand to nest a substantial distance into another chafing stand without wedging. Without offsets all prior art chafing stands tended to wedge when nested together and were not easily separated.

The nesting problem was considered inherent to the prior art construction of chafing stands unless manufactured with "offsets". In accordance with the present invention the problem of wedging has been traced to the conventional practice of constructing the chafing stands 10 by placing each wire leg 15 alongside and in contact with the rim 12 to form a weld at the point of contact using conventional welding equipment. This inherently results in what is conventionally referred to as an "overlap weld" at the point of contact and occurs whenever the wire leg overlaps the rim either on the outside or inside perimeter of the rim. A typical overlap weld 17 is shown in the chafing stands 10 of both FIGS. 1 and 2 which in turn correspond to the chafing stands disclosed in U.S. Pat. Nos. 5,996,948 and 6,520,354 respectively.

It has been discovered in accordance with the present invention that the need to form "offsets" can be eliminated provided the wire legs are welded at least to the longer or longitudinal sides of the rim using a welding operation in which the members to be welded are arranged relative to each other to form a weld between each wire leg and at least the longer or longitudinal side of the rim wherein the longitudinal axis of each such wire leg intersects the longitudinal axis of the rim to which it is being welded to form a welded intersection in a configuration substantially or essentially in the form of a "T". A weld formation in the configuration of a "T" is not of itself new but requires using a jig to hold the wire legs in this arrangement against the rim before welding them or using a welding machine which operates to hold the wire legs in line and in a plane in common with the rim during welding. This, in general, requires more skill, is less forgiving and is accordingly a more expensive welding procedure.

The chafing stand 40 of the present invention, as is shown in FIGS. 3 to 10 inclusive, includes a rim 42 of substantially rectangular configuration having two longer sides 43 extending longitudinally and two shorter sides 44 extending laterally. The chafing stand 40 may also include a second rim corresponding to the wire holder connector assembly 19 located below the rim 42 which is also of substantially rectangular configuration with two longer sides 46 and two shorter sides 47. The chafing stand is adapted to support an aluminum pan (not shown) and includes a plurality of wire legs 50 joined to the rim 42 to maintain the aluminum pan in an upright position above ground. In the embodiments of FIGS. 3 and 7 the plurality of wire legs 50 are located at each respective corner of the chafing stand 40 with each wire leg 50 having two upright sections 51a and 51b with the upright section 51a welded to the longer side 43 of rim 42 and the upright section 51b welded to the shorter side 44 of rim 42. For simplicity each of the wire legs 50 will be given the same reference numbers. Each wire leg 50 also includes a bottom section 52 which bridges the two upright sections 51a and 51b and lies in a horizontal plane level with the ground.

In the embodiment of FIG. 3 the upright sections 51b of each pair of wire legs 50 are interconnected to one another on each opposite side of the stand 40 to form a handle 60. This arrangement of wire legs 50 for forming the handles 60 is similar to the arrangement shown in U.S. Pat. No. 5,996,948 the disclosure of which is incorporated herein by reference. Each handle 60 is welded to the shorter side 44 of the rim 42 and forms a welded joint 62 at each welded junction between each upright section 51b and the rim 42. The welded joint 62 formed between the handle 60 and rim 42 may be a conventional overhead weld which displaces or "offsets" the rim from the handle as is shown in FIG. 4. However, the welds 64 to be formed between each upright section 51a of each pair of wire legs 50 and the rim 42 must be formed with each upright section 51a arranged in line with and abutting the longer side 43 of the rim 42 such that the longitudinal axis of each upright section 51a intersects the longitudinal axis of the side 43 of the rim 42 as is shown in FIG. 5 at an included angle of substantially 90°. Moreover, the intersection of each upright section 51a and the longer side 43 of the rim 42 should substantially be in the configuration of a "T" (hereafter a "T welded intersection"). A T welded intersection does not need to be formed between the handles 60 and the shorter opposite sides 44 of the rim 42 because the weld 62, as is shown in FIG. 4, is spaced apart from the longitudinal axis of each upright section 51b as a result of the curvature of the handle 60.

In the embodiment of the invention shown in FIGS. 3 and 7A, 7B the stand 40 includes a lower rim 45 of substantially rectangular configuration having two longer sides 46 extending longitudinally and two shorter sides 47 extending laterally. A pair of wires 48 are welded at opposite ends to the longer sides 46 and a wire 49 extends transverse to the wires 48 and parallel to longer sides 46. Each of the wires 48 and 49 are bent to form wire depressions 53 and 54 which intersect at each respective end of the stand 40 to form a wire holder connector assembly to support chafing fuel heaters (not shown) within the areas formed by the intersecting wire depressions 53 and 54. The wire holder connector assembly of FIGS. 3 and 7A, 7B is similar to the wire holder connector assembly of FIG. 2. It should be understood that the choice of wire holder connector assembly is not critical to the subject invention and, for example, a wire holder connector assembly may be selected from the prior art as shown, for example, in the configuration of FIG. 1. The wires 48 and 49 may be welded in a conventional manner to form overlap welds at the intersection of the wires and the lower rim 45. However, it is preferred that the wires 48 and 49 be welded to the lower rim 45 to form a weld 68 in which the longitudinal axis of each wire 48 and 49 intersects the longitudinal axis of the lower rim 45 as shown in FIG. 6 at an included angle of substantially 90° and to substantially form a T welded intersection.

In the embodiment of FIG. 7A handles 65 are welded on each opposite side of the stand 80 to the shorter side 44 of the upper rim 42 and are independent of the wire legs 50. FIG. 7B is identical to FIG. 7A except that the handles 65 are integrally formed to be part of the shorter side 44 of the upper rim 42. The stand 80 in both FIGS. 7A and 7B is otherwise essentially equivalent to the stand 40 of FIG. 3 and common reference numbers are used to identify the common parts. Moreover, since the stand 80 in FIG. 7A,7B is symmetrical and substantially equivalent in construction to the stand 40 only one half of the stand 80 is shown in each of the FIGS. 7A and 7B. Since the wire legs 50 in FIG. 7A are independent of the handles 65 the upright sections 51b of each pair of legs 50 are welded directly to the shorter side 44 of the rim 42 for forming a weld 64 at the junction between the upright sections 51a and the rim 42 as is shown in FIG. 8 equivalent to the weld 64 in FIG. 5. Moreover, the other upright sections 51a of each pair of legs 50 are welded directly to the longer side 43 of the rim 42 for forming a weld 64 at the junction between the upright sections 51a and the rim 42 as is shown in FIG. 9 which is also equivalent to the weld 64 in FIG. 5. In each instance each pair of wire legs 50 are welded in an arrangement relative to the rim 42 such that a T welded intersection is formed with the longitudinal axis of each of the upright section 51a and 51b intersecting the longitudinal axis of the rim 42 as shown in FIGS. 8 and 9 at an included angle of substantially 90° and in substantially a "T" configuration. Likewise the wire 48 should preferably form a T welded intersection with the side 46 of the lower rim.

The formation of a T welded intersection is essential to the subject invention in the formation of the welds 64 and preferably 68 but not in the formation of weld 62 between the handle 60 and the rim 42. The chafing stand of the present invention otherwise resembles the chafing stand of the prior art such as shown in FIGS. 1 and 2.

What I claim is:

1. A method for constructing a wire chafing stand adapted to support a pan with the chafing stand having an open wire frame structure of wire steel comprising a rim of any desired geometry having longitudinal and lateral sides and a plurality of wire legs having at least two wire legs extending from the rim in a vertical orientation relative to ground level to maintain the pan in an upright position along a substantially horizontal plane above ground level with the method comprising the step of welding the longitudinal sides of the rim to each of the at least two vertically oriented wire legs in an arrangement forming a T-welded intersection there between in which the longitudinal axis of each such wire leg intersects the longitudinal axis of the rim to which it is being welded at an included angle of substantially 90°.

2. A method as defined in claim 1 wherein the rim is in a rectangular geometry with the longitudinal sides being longer than the lateral sides and further comprising wire legs extending from the lateral sides of the stand and being interconnected to one another to form handles for the chafing stand with each handle being welded to a lateral side of the rim.

* * * * *